(12) United States Patent
Balgard et al.

(10) Patent No.: US 8,327,049 B2
(45) Date of Patent: Dec. 4, 2012

(54) ELECTRICAL PROCESS INTERFACE DEVICE

(75) Inventors: Lennart Balgard, Arboga (SE); Krister Landernas, Vasteras (SE); Tobias Gentzell, Vasteras (SE)

(73) Assignee: ABB Research Ltd. (CH)

( * ) Notice: Subject to any disclaimer, the term of this patent is extended or adjusted under 35 U.S.C. 154(b) by 13 days.

(21) Appl. No.: 12/978,009

(22) Filed: Dec. 23, 2010

(65) Prior Publication Data

US 2011/0160929 A1 Jun. 30, 2011

Related U.S. Application Data

(63) Continuation of application No. PCT/EP2009/057981, filed on Jun. 25, 2009.

(30) Foreign Application Priority Data

Jun. 25, 2008 (EP) ................................ 08158974

(51) Int. Cl.
*G06F 13/12* (2006.01)
*H02H 3/00* (2006.01)
*H01R 13/62* (2006.01)

(52) U.S. Cl. ............................ 710/62; 361/2; 439/312

(58) Field of Classification Search ............... 710/62; 361/2; 439/312
See application file for complete search history.

(56) References Cited

U.S. PATENT DOCUMENTS

| 7,746,791 B2* | 6/2010 | Wimmer | 370/242 |
| 2007/0121257 A1* | 5/2007 | Maitra et al. | 361/2 |

FOREIGN PATENT DOCUMENTS

| CN | 101035099 A | 9/2007 |
| WO | 2005055538 A1 | 6/2005 |
| WO | 2008046743 A2 | 4/2008 |
| WO | WO 2008046743 A2 * | 4/2008 |

OTHER PUBLICATIONS

Tianqi Xu, et al.; "Bay Level IED Modeling and Realizing Using IED 61850"; Transmission and Distribution Conference and Exposition; Apr. 21, 2008; pp. 1-7.
European Search Report; Application No. EP 08 15 8974; Issued: Dec. 4, 2008; Mailing Date: Dec. 15, 2008; 8 pages.
International Preliminary Report on Patentability; Application No. PCT/EP2009/057981; Issued: Oct. 5, 2010; 9 pages.

(Continued)

*Primary Examiner* — Chun-Kuan Lee
*Assistant Examiner* — David Martinez
(74) *Attorney, Agent, or Firm* — St. Onge Steward Johnson & Reens LLC

(57) ABSTRACT

An electrical process interface device for provision in a low control and protection level of a Substation Automation or Distribution Automation system; the device includes a process interface unit for interfacing the electrical process at the low control and protection level, which unit has a number of parallel data connections on which I/O data related to control and protective devices on higher control and protection levels may be transmitted. The device also includes a signal conversion unit connected to the data connections, which unit packets data of the data connections according to a communication standard used by control and protective devices on the at least one higher control and protection level for allowing data to be directly transmitted between the electrical interface device on the low control and protection level and other devices on higher control and protection levels.

5 Claims, 2 Drawing Sheets

OTHER PUBLICATIONS

International Search Report & Written Opinion of the International Searching Authority; Application No. PCT/EP2009/057981; Issued: Aug. 12, 2009; Mailing Date: Aug. 19, 2009; 12 pages.
Mackiewicz; "Overview of IEC 61850 and Benefits"; PES TD 2005/2006; 8 pages.
Andersson, et al.; "Substation Automation Based on IEC 61850 with New Process-Close Technologies"; 2003 IEEE Bologna Powertech; 6 pages.
Brand; "The Standard IEC 61850 as Prerequisite for intelligent Applications in Substations"; Power Engineering Society General Meeting; Jun. 2004; 6 pages.

* cited by examiner

ELECTRICAL PROCESS INTERFACE DEVICE

CROSS-REFERENCE TO RELATED APPLICATIONS

The present application is a continuation of pending International patent application PCT/EP2009/057981 filed on Jun. 25, 2009 which designates the United States and claims priority from European patent application 08158974.9 filed on Jun. 25, 2008, the content of which is incorporated herein by reference.

FIELD OF THE INVENTION

The present invention generally relates to the field of substation automation or distribution automation systems and more particularly towards an electrical process interface device for provision in a low control and protection level of a Substation Automation or Distribution Automation system.

BACKGROUND OF THE INVENTION

In order to enable communication between various devices in substation automation or distribution automation systems there has evolved a standard that enables communication between various devices of various device suppliers. This standard is IEC 61850. According to this standard software elements of equipment are hierarchically organized in a number of levels including a logical device level, a logical node level, a data object level and a data attribute level. A logical device here normally corresponds to a device in such a system, while a logical node corresponds to a function of the device, which data objects and data attributes relate to data of such a function. There may here be several logical nodes in a logical device for a number of various functions.

One type of device used in such systems is the intelligent electronic device (IED), which is used for monitoring and/or controlling pieces of local process equipment in such systems, for instance equipment like circuit breakers and transformers. In order to perform this monitoring and control there are provided I/O (input/output) connections on the IED leading to such pieces of equipment. These pieces of local process equipment are process interface devices, because they are the interfaces to an electrical process being controlled by the substation automation or distribution automation system. The electrical process may be an electrical power generation, transmission or supply process. Such an IED does thus communicate directly with these process interface devices using direct point-to-point connections or a local communication network.

IEDs and devices on higher levels do use the IEC 61850 communication standard for communicating with each other. Examples of this are devices in the protection and control product series IED670 being sold by ABB.

However the process interface devices do normally today not have the capability to communicate with other devices at higher levels in the system than the IED they are connected to.

It would therefore be of interest if these devices were able to communicate with other devices on higher control and protection levels, which would enable the provision of for instance a more flexible control and protection structure.

CN101035099 describes a general gateway design method for conversion of the 103 protocol to the IEC 61850 standard.

WO 2005/055538 describes a process interface device that may be a temperature sensor, which communicates with a medium converter using a serial RS 232-interface. The medium converter is a serial/Ethernet-converter which converts data from the device into a first format x. A data message with the first format x is then transferred to a gateway on a data bus, which in turn converts it to a data message according to a second format, which is the IEC 61850 format. Thereafter the IEC 61850 message is transferred to an IEC 61850 device.

It would therefore be of interest to provide an improved process interface device in a substation automation or distribution automation system that allows communication with devices on several higher levels.

SUMMARY OF THE INVENTION

One object of the present invention is therefore to provide an improved electrical process interface device for provision in a low control and protection level of a Substation Automation or Distribution Automation system that is able to communicate with devices on several higher control and protection levels.

This object is according to a first aspect of the present invention solved through an electrical process interface device for provision in a low control and protection level of a Substation Automation or Distribution Automation system and comprising:

a process interface unit for interfacing the electrical process at said low control and protection level and having a number of parallel data connections on which I/O data related to control and protective devices on at least one higher control and protection level may be transmitted, and a signal conversion unit connected to said data connections and arranged to packet data of the data connections according to a communication standard used by control and protective devices on said at least one higher control and protection level for allowing said data to be directly transmitted between the electrical interface device on said low control and protection level and at least one other device on higher control and protection levels.

The present invention has a number of advantages. It provides an electrical process interface device that can communicate directly with any other device via a computer communication network. Data can thus be transmitted directly between the electrical interface device on the low control and protection level and other devices on higher control and protection levels. This enables providing of data, such as status and control data, between the electrical process interface device and control and protection equipment on higher levels in a more flexible way and without the need for intermediate signal conversion.

BRIEF DESCRIPTION OF THE DRAWINGS

The present invention will in the following be described with reference being made to the accompanying drawings, where FIG. 1 schematically shows a substation automation system including a number of devices at various hierarchical control and protection levels, of which one is an electrical process interface device of the present invention.

DETAILED DESCRIPTION OF THE INVENTION

In the following, a detailed description of preferred embodiments of a device according to the present invention will be given.

Figure 1:
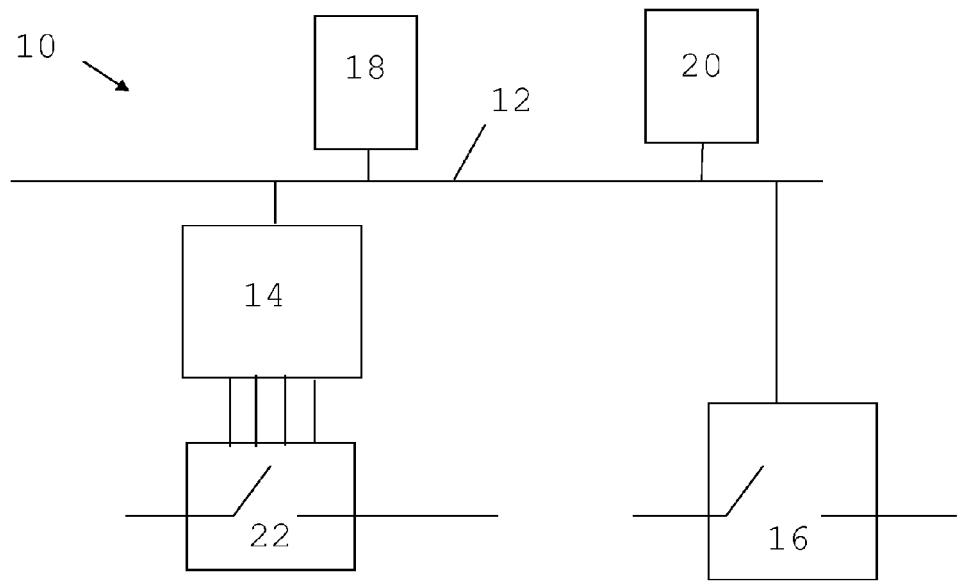

The present invention may be provided in a substation automation or distribution automation system. One such system 10 is schematically shown in FIG. 1. In FIG. 1 there are a number of devices connected to a computer communication network 12. There is here a first device 14, which is an intelligent electronic device (IED), a second device 16 that is an electrical process interface device according to the present invention, a third device 18 that may be an HMI (human Machine Interface) and a fourth device 20 that may be a substation controller. These devices all communicate via the computer communication network 12 using the IEC 68150 communication protocol. The first device 14 is furthermore connected to a first piece of local equipment 22. This piece of local equipment 22 is a conventional electrical process interface device that is an interface to a process being controlled or monitored by the IED 14. This process is typically an electrical process, like an electrical power generation or transmission process or an electrical power supply process. In this regard the piece of local equipment 22 may be a circuit breaker or a transformer. The piece of local equipment 22 here has direct point-to-point connections to the IED 14. There is thus no communication over the computer communication network 12 for this device 22. The electrical process interface device 16 according to the present invention, which also interfaces the electrical process and may also include a circuit breaker or a transformer or some other type of element, is on the other hand connected to the computer communication network 12. This means that it may communicate with the IED 14 but also with the other devices 18 and 20 connected to the computer communication network 12. The devices 14, 18 and 20 are here control and protection devices.

The piece of local equipment 22 and the electrical process interface device 16 are here provided on a low hierarchical control and protection level, which is here furthermore a first lowest hierarchical control and protection level and the first device 14 is here provided on a higher hierarchical control and protection level, here on a second control and protection level, while the third and fourth devices 18 and 20 are provided on an even higher hierarchical control and protection level, which is here a third and highest control and protection level. The electrical process interface device 16 may here communicate with all other devices on the computer communication network 12.

Figure 2:
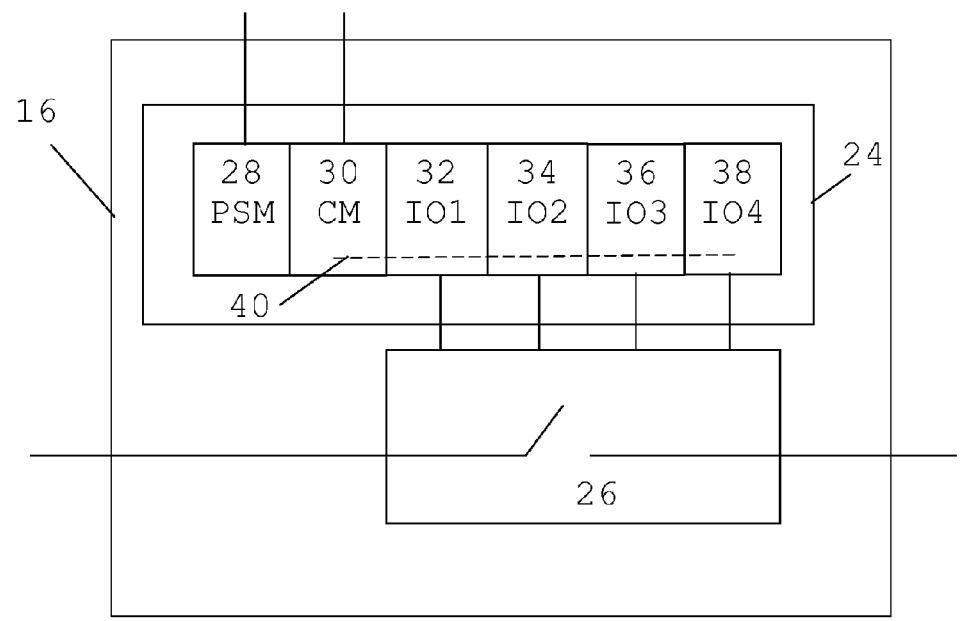
FIG. 2 shows a block schematic of the electrical process interface device according to the present invention.

FIG. 2 shows a block schematic of the electrical process interface device 16 according to the present invention. The device 16 includes a signal conversion unit 24, which is a modular unit. It is modular in that it includes a number of hardware modules 28, 30, 32, 34, 36 and 38 providing various functionalities of the device 16. These hardware modules are replaceable and mechanically separable. This means that it is possible to vary the number and types of hardware modules in the signal conversion unit 24. There is here a first hardware module 28 that is a power supply module PSM, which is connected to a power supply for receiving power for the whole signal conversion unit 24 and for providing power to the rest of the modules in this unit 24. The power may here be received from the process being controlled in the system. To this first module 28 there is connected a second module 30, which is a communication module CM. This communication module 30 is provided for communication with other devices over the computer communication network, which communication is here serial Ethernet IEC 61850 communication.

The second module 30 is in turn connected to a third module 32, which is a first I/O module IO1 that may be a first type of input module, for instance an input module handling analog input values. This is followed by a fourth module 34, which is here a second I/O module IO2 that may be a second type of input module, like one handling digital input values. This fourth module 34 is here followed by a fifth module 36, which is here a third I/O module IO3 that may be a first type of output module, for instance an output module handling analog output values. Finally there is a sixth module 38, which is here a fourth I/O module IO4 that may be a second type of output module, for instance one handling digital output values. The I/O modules 32, 34, 36, 38 are provided for direct communication with a process interface unit 26 that is also provided in the electrical process interface device.

The various modules, except for the power supply module 26, are furthermore interconnected by an inter-module data bus 40 (here shown as a dashed line). As the various modules are replaceable they can be provided in any position in the signal conversion unit 24. There may also be more or fewer modules. Here there is normally always a power supply module and a communication module. Then there are as many I/O modules as are necessary for handling various I/O connections to the process interface unit 26.

The process interface unit 26 is a conventional piece of local system equipment, like for instance a circuit breaker or a transformer. This unit may emit and receive a number of data signals, which may be both of digital and analog nature. In order to do this the unit has a number of parallel data connections, where one leads to the first I/O module 32, one leads to the second I/O module 34, one leads to the third I/O module 36 and one leads to the fourth I/O module 38. The I/O modules 32, 34, 36 and 38 of the signal conversion unit 24 thus here have direct parallel point-to-point connections with the process interface unit 26 in order to provide and receive data to and from the process interface unit 26. There are normally a fixed number of such connections per I/O module. These are here being shown as one per I/O module. It should however be realized that this number may be varied and that this variation may also differ between different types of I/O modules.

Figure 3:
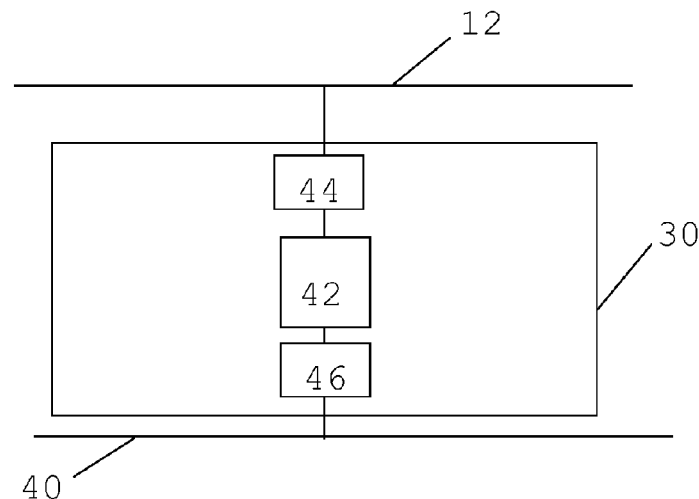
FIG. 3 shows a block schematic of a communication module in the electrical process interface device of FIG. 2, and FIG. 4 schematically shows the hierarchical structure of software elements according to the IEC 68150 standard.

The communication module 30 in the signal conversion unit of the electrical process interface device is shown in more detail in a block schematic provided in FIG. 3. The communication module 30 includes a control entity 42 providing functionality for controlling communication with the computer communication network 12 via a communication interface 44 as well as for communicating with the other modules via the inter-module bus 40 via a bus interface 46.

Figure 4:
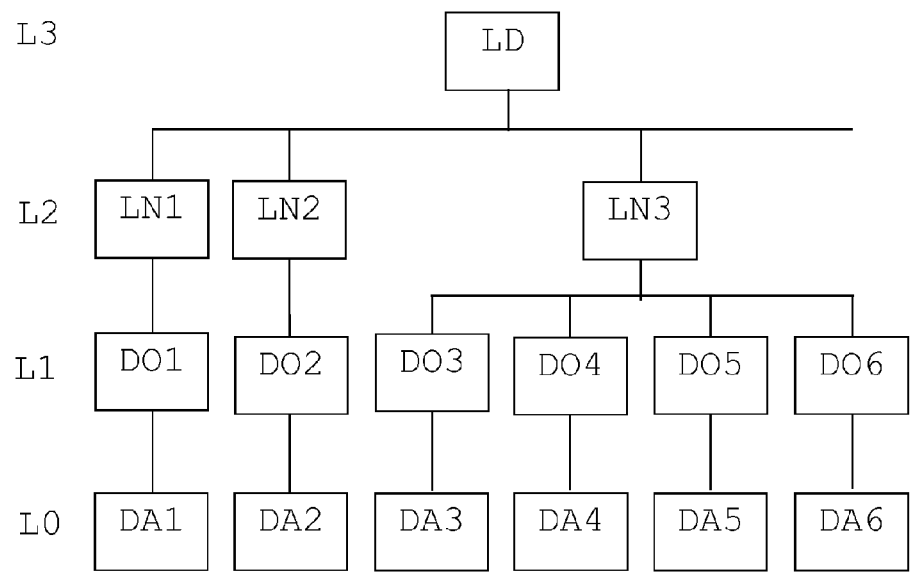

The electrical process interface device 16 in FIG. 2 has a structuring of its own functionality according to the IEC 61850 communication standard and also communicates over the computer communication network in accordance with this standard. This structuring is furthermore provided by the signal conversion unit 24 and more particularly by the communication module 30 of the signal conversion unit 24. FIG. 4 schematically shows a part of the hierarchical structure used by this standard, which is applicable on the electrical process interface device 16 in FIG. 2. According to the standard, the structure includes a series of elements hierarchically linked to each other. Here there are a number of first bottom elements DA1, DA2, DA3, DA4, DA5 and DA6, where each is a data provision element provided on a first lowest level L0 and denoted data attribute DA, a second higher data provision element DO1, DO2, DO3, DO4, DO5 and DO6 associated with a respective data attribute DA is provided on a second higher level L1 and denoted data object DO, a third element on a third higher level L2 associated with a respective data object is termed a logical node LN1, LN2 and LN3. There is here a fourth element LD on a fourth higher level L3 that is termed a logical device and which is associated with or linked to each logical node LN1, LN2 and LN3, while each logical node is associated with or linked to one or more corresponding data objects DO1, DO2, DO3, DO4, DO5, DO6, where each data object DO is in turn connected or linked to one or more corresponding data attributes DA1, DA2, DA3, DA4, DA5, DA6. The logical device LD is here a device related element in that it is related to a group of functions provided by the electrical process interface device 16, while a logical node is a function element in that it is related to a function of the electrical process interface device. In this way the structure in FIG. 4 provides one logical device LD that is connected to three logical nodes LN1, LN2 and LN3, where each logical node is connected to one or more data objects DO1, DO2, DO3, DO4, DO5 and DO6, where each data object is in turn connected to a data attribute DA1, DA2, DA3, DA4, DA5 and DA6.

Now there will follow an exemplifying description of the structure in FIG. 4 in relation to the modules in FIG. 2. A first logical node LN1, a first corresponding data object DO1 and a first corresponding data attribute DA1 are all here associated with a first common function provided by the communication module 30. This node LN1 may be a logical node LLN0, which is a node that specifies characteristics of the electrical process interface device 16. A second logical node LN2, a second corresponding data object DO2 and a second corresponding data attribute DA2 are all here associated with a second common function provided by the communication module 30. This node LN2 may be a logical node LPHD (Logical Node for Physical Device) that describes common properties of the electrical process interface device 16. A third logical node LN3 associated with a function provided by all the I/O modules 32, 34, 36 and 38 is furthermore provided. This node LN3 may be a logical node XCBR, which is a logical node associated with a circuit breaker. To this third logical node LN3 there is associated a third data object DO3 and a third corresponding data attribute DA3. These two elements DO3 and DA3 may here be related to data provided by the first I/O module 32. To the third logical node LN3 there is also associated a fourth data object DO4 and a fourth corresponding data attribute DA4. These two elements DO4 and DA4 may here be related to data provided by the second I/O module 34. To the third logical node LN3 there is furthermore associated a fifth data object DO5 and a fifth corresponding data attribute DA5. These two elements DO5 and DA5 may here be related to data provided by the third I/O module 36. To the third logical node LN3 there is finally associated a sixth data object DO6 and a sixth corresponding data attribute DA6. These two elements DO6 and DA6 may here be related to data provided by the fourth I/O module 38.

It should here be realized that the structure in FIG. 4 is greatly simplified. There may therefore be more logical nodes, there may be more or fewer data objects associated with a logical node as well as more than one data attribute associated with a data object. The data object and data attribute elements furthermore allow nested elements. This means that an element on one level may include one or more other elements on the same level.

To the structure in FIG. 4 further elements may be added. There may be further elements on a fifth higher level termed a server, on a sixth higher level termed Access Point and on a seventh highest level termed an IED. The electrical process interface device of the present invention may therefore in the context of IEC 61850 be regarded as an IED by other devices.

In reality it is not such a device though, since it does not include control and protection functions normally associated with an IED. A logical device LD, can here be seen as the device itself or to correspond to the collection of the various functions in the device, a logical node LN corresponds to one specific function of this logical device, while a data object DO corresponds to data associated with the function and the data attribute DA corresponds to an attribute of such data. An attribute may here be such diverse things as an indication of analog or digital data, an indication of if the data is control data or status data and data value range. An attribute may furthermore indicate other relations to a data object, such as if there should be a time stamp provided.

According to the principles of the present invention the hardware modules implement functionality related to the function related elements of the standard, i.e. to the logical nodes. For this reason the logical device element LD is provided as software in the communication module 30 of the signal conversion unit 24 and then in the control entity 42 of this communication module 30. The logical nodes LN1 and LN2 implementing common functions as well as the corresponding data objects DO1 and DO2 and data attributes DA1 and DA2 are here also provided as software in the control entity 42 of the communication module 30 as are the logical nodes for all I/O modules. Here there is only one such node LN3. Here also the data objects DO3, DO4, DO5 and DO6 of the I/O modules 32, 34, 36 and 38 are provided as software in the control entity 42 of the communication module 30. However the corresponding data attributes DA3, DA4, DA5, and DA6 may be provided in the respective I/O modules 32, 34, 36 and 38. If a logical node associated with the power supply module 28 is provided, this may here be provided in the communication module 30 as well.

The control entity 42 of the communication module 28 may here be arranged to associate the data attributes DA3, DA4, DA5, DA6 of the I/O modules 32, 34, 36, 38 with the logical nodes LN3 via the inter-module bus at powering up of the device, i.e. when the power supply module 28 first supplies power to the other modules.

Through this way of providing an electrical process interface device the communication module is the main module for handling the elements according to the communication standard, which the other modules will depend on for communication. The communication module will then include all the logical nodes needed for the device. The control entity of this module may thus include an association between a data object of a logical node provided for an I/O module to the corresponding attribute, which attribute may be provided as software in the I/O module itself. The logical nodes and associated data objects and data attributes in the control entity are furthermore replaceable in that some or all of them can be deleted and others may be added.

The communication module of the signal conversion unit is here arranged to packet data of the data connections received and transmitted via the I/O modules to and from the process interface unit according to the above-mentioned communication standard used by the control and protection devices on the higher control and protection levels. In this way data is provided on the computer communication network that can be handled according to this standard. This data is then sent directly between the higher level device and the electrical process interface device.

In this way there is provided an electrical process interface device that can communicate directly with any other device via the computer communication network. Data can thus be transmitted directly between the electrical interface device on the first low control and protection level and other devices on higher control and protection levels. This enables providing of status and control data between the electrical process interface device and control and protection equipment on higher levels in a more flexible way and without the need for intermediate signal conversion.

Through providing modular hardware, it is furthermore possible to make several different types of pieces of local process equipment into an electrical process interface device having the above-described communication ability. This means that a great number of various signal conversion units may be provided for different types of process interface units using different combinations of the above described hardware modules. In this way it is therefore possible to adapt an existing piece of local process equipment for communication according to a communication standard such as IEC 61850 in a cost efficient manner, since various module combinations may be used for several types of pieces of local process equipment.

The control entity of the communication module may be provided in the form of a processor with corresponding program memory including computer program code for performing its functionality. Also the functionality for handling the attributes in the I/O modules may be provided in this way. This functionality can as an alternative be provided through the use of logic circuits.

There are a number of possible variations that can be made to the present invention apart form those already mentioned. The I/O modules may for instance include the corresponding data objects in addition to the data attributes. There may also be more logical nodes in the electrical process interface device than the ones that have been described.

From the foregoing discussion it is evident that the present invention can be varied in a multitude of ways. It shall consequently be realized that the present invention is only to be limited by the following claims.

What is claimed is:

1. An electrical process interface device for provision in a low control and protection level of a Substation Automation or Distribution Automation system and comprising:
   a process interface unit for interfacing the electrical process at said low control and protection level and having a number of parallel data connections on which I/O data related to control and protective devices on at least one higher control and protection level may be transmitted, and
   a signal conversion unit connected to said data connections and arranged to packet data of the data connections according to a communication standard used by control and protective devices on said at least one higher control and protection level for allowing said data to be directly transmitted between the electrical interface device on said low control and protection level and at least one other device on higher control and protection levels, wherein the communication standard provides a series of elements (LD, LN1, LN2, LN3, DO1, DO2, DO3, DO4, DO5, DO6, DA1, DA2, DA3, DA4, DA5, DA6) hierarchically linked to each other and including a device related element (LD), a number of function elements (LN1, LN2, LN3) linked to the device related element (LN) and a number of data provision elements (DO1, DO2, DO3, DO4, DO5, DO6, DA1, DA2, DA3, DA4, DA5, DA6) linked to the function elements and the signal conversion unit provides a structuring of the device functionality according to said communication standard and being provided as mechanically separable, replaceable hardware modules interconnected via an inter-module bus, said modules implementing functionality related to the function related elements (LN1, LN2, LN3) of the standard and including a communication module for communicating with other devices of the system via a computer communication network and at least one I/O module being connected to at least one of said data connections, where said communication module includes a control entity providing a device related element (LN) of the communication standard for the device, common function elements (LN1, LN2) of the device and at least one function element (LN3) associated with functions provided by all the I/O modules wherein all I/O modules providing data related functions include data provision elements (DA3, DA4, DA5, DA6) according to the standard and being associated with a corresponding function element (LN3) in the communication module and wherein the communication standard is a standard such as IEC 61850.

2. The device according to claim 1, wherein the I/O modules provide the data related elements at the lowest hierarchical level of the linked elements providing attributes of data defined by a corresponding higher level data provision element (DO3, DO4, DO5, DO6), where said higher level data provision element and corresponding function related element (LN3) are provided by the communication module.

3. The device according to claim 1, wherein the communication module is arranged to associate, at powering up of the device, the data provision elements (DA3, DA4, DA5, DA6) of the I/O modules with corresponding elements (LN3) associated with the function of the I/O modules in the communication module.

4. The device according to claim 1, further comprising a power supply module providing power to the other modules of the device.

5. The device according to claim 2, wherein the communication module is arranged to associate, at powering up of the device, the data provision elements (DA3, DA4, DA5, DA6) of the I/O modules with corresponding elements (LN3) associated with the function of the I/O modules in the communication module.

* * * * *